(12) United States Patent
Petcavich

(10) Patent No.: US 6,977,090 B2
(45) Date of Patent: Dec. 20, 2005

(54) METHOD FOR PRESERVING THE NATURAL APPEARANCE OF FRESH AND MINIMALLY PROCESSED FRUITS AND VEGETABLES

(76) Inventor: Robert J. Petcavich, 4983 Bradshaw Ct., San Diego, CA (US) 92130

( * ) Notice: Subject to any disclaimer, the term of this patent is extended or adjusted under 35 U.S.C. 154(b) by 310 days.

(21) Appl. No.: 10/336,138

(22) Filed: Jan. 3, 2003

(65) Prior Publication Data

US 2004/0131734 A1    Jul. 8, 2004

(51) Int. Cl.$^7$ .............................................. A23L 1/212
(52) U.S. Cl. ...................... 426/102; 426/615; 426/639; 426/658
(58) Field of Search ............................... 426/615, 639, 426/658, 102

(56) References Cited

U.S. PATENT DOCUMENTS

| | | | |
|---|---|---|---|
| 5,346,712 A | 9/1994 | Cherry et al. | 426/321 |
| 5,547,693 A | 8/1996 | Krochta et al. | 426/90 |
| 6,254,912 B1 * | 7/2001 | Takeuchi et al. | 426/443 |

OTHER PUBLICATIONS

"Fundamental Mechanisms—Trehalose", Health & Food Technologies, May 11, 2001.

* cited by examiner

*Primary Examiner*—Helen Pratt
(74) *Attorney, Agent, or Firm*—Greer, Burns & Crain, Ltd.

(57) ABSTRACT

A method of preserving the natural color and appearance of fresh and minimally processed fruits and vegetables, especially for inhibiting desiccation and/or discoloration of freshly processed vegetables such as carrots, resides in coating the fruit or vegetable with an aqueous solution of trehalose or of trehalose combined with one or more other sugars.

14 Claims, No Drawings

METHOD FOR PRESERVING THE NATURAL APPEARANCE OF FRESH AND MINIMALLY PROCESSED FRUITS AND VEGETABLES

FIELD OF THE INVENTION

The invention relates to methods for preserving the natural color and appearance of fresh and minimally processed produce, and more particularly, to methods for inhibiting desiccation and discoloration of such produce; for example, to inhibit the formation of white blush on fresh and minimally processed fruits and vegetables, especially carrots and the like.

BACKGROUND

The appearance of fresh produce is of significant importance to the consuming public. Fresh and minimally processed fruits and vegetables are susceptible to surface dehydration. Cell membranes rupture; and lignin is released and desiccated on the surface of the produce. The dehydration or desiccation often results in a noticeable whitening of the surface of the produce that the consumer identifies with a lack of freshness. For example, freshly processed carrots that have been in refrigerated storage for just a few days begin to develop a whitish, chalk-like appearance on their cut, sliced, peeled or abraded surfaces. In the produce industry, this whitish, chalk-like appearance is known as white blush.

Produce that appears dried-out or discolored, e.g., with white blush discoloration is unsightly and unappetizing. As a result, consumers invariably associate such appearance with distastefully old produce, even though the taste and nutritional value of the produce may not be diminished. This leads to significant commercial waste when produce is pulled from the shelf due simply to appearance.

The causation of white blush on produce, and suggested methods for inhibiting the formation of white blush, are described in U.S. Pat. Nos. 5,346,712 and 5,547,693, to which reference is made for a more detailed explanation.

SUMMARY OF THE INVENTION

The primary object of the present invention is to provide an improved method for preserving the natural appearance of produce, particularly for inhibiting desiccation and/or discoloration of fresh and minimally processed produce, and more particularly for inhibiting the formation of white blush on fruits and vegetables such as carrots, radishes, peppers, corn, turnips, sweet potatoes, leeks and celery.

In accordance with the invention, dehydration and/or formation of white blush and/or other discoloration on fresh and minimally processed fruits and vegetables is inhibited by coating the same with an aqueous solution of trehalose or trehalose combined with other sugars. The method is simple, inexpensive, and highly effective.

These and other objects and advantages of the invention will become apparent to those of reasonable skill in the art from the following detailed description.

DETAILED DESCRIPTION OF PREFERRED EMBODIMENTS

The following is a detailed description of certain embodiments of the invention presently deemed by the inventor to be the best mode of carrying out his invention.

The method of the invention comprises the step of coating produce with an aqueous solution including trehalose. The produce may be fresh or fresh and minimally processed, i.e., abraded, scraped, peeled, sliced, diced or shredded. The coating may be applied in any manner conventional in the produce processing industry, e.g., soaking, dipping, spraying, cascading fall, tumbling, etc.

Trehalose is the particular sugar. Other sugars, such as monosaccharides, that can be used in combination with trehalose, are sucrose, mannose, glucose, fructose and ribose, and the ester, aldehyde and ketone derivatives of these sugars. Other additives and stabilizers can be used such as anti-oxidants, anti-microbials and surfactants, and wetting agents to lower the surface tension of the coating solution.

The concentration of the sugar or sugars in the aqueous solution may range from 1 to 50% by weight. The concentration of trehalose in the aqueous solution is at least about 1% by weight, and may range from about 1 to 20% by weight, with about 3% to about 5% by weight being preferred.

The produce to be treated is preferably soaked in the aqueous solution for a period of 1 to 20 minutes depending upon the trehalose concentration, the produce involved and compatibility with the manufacturing process being used to process and package the produce. No special packaging is required. Conventional packaging and modes of transport will suffice.

EXAMPLE 1

Control

To 500 ml (milliliters) of fresh water, 250 g (grams) of fresh baby carrots were added and allowed to soak 3 minutes. They were removed from the water, shaken to remove excess water, and placed uncovered in a refrigerator set at 41° F. The carrots had extensive white blush on the surface within 12 hours.

EXAMPLE 2

10% Solution

To 500 ml of fresh water, 50 g of trehalose was added and allowed to dissolve. Then 250 g of fresh cut baby carrots were placed in the solution for 3 minutes, removed, shaken and then stored uncovered in a refrigerator set at 41° F. The carrots remained fresh looking with no blush for 3 days.

EXAMPLE 3

20% Solution

To 500 ml of fresh water, 100 g of trehalose was added and allowed to dissolve. Then 250 g of fresh cut baby carrots were placed into the solution for 3 minutes, removed, shaken and placed uncovered in a refrigerator set at 41° F. The carrots remained fresh looking with no blush for 7 days.

EXAMPLE 4A

Control

Washed and sliced radishes were placed uncovered in a refrigerator set at 45° F. The radishes shriveled and the skin turned black within 3 days.

EXAMPLE 4B

5% Solution

Washed and sliced radishes were immersed in a 5% by weight aqueous solution of trehalose for 15 minutes and placed uncovered in a refrigerator set at 45° F. After 3 days, the radishes exhibited no change in physical condition or appearance and the skin remained radish red.

EXAMPLE 5A

Control

Washed and sliced green peppers were placed uncovered in a refrigerator set at 47° F. After 3 days, the peppers were somewhat shriveled and appeared dehydrated or dry.

EXAMPLE 5B

5% Solution

Washed and sliced green peppers were immersed for 15 minutes in a 5% by weight aqueous solution of trehalose and placed uncovered in a refrigerator set at 47° F. After 3 days, the peppers remained bright green and appeared moist, fresh and appetizing.

The invention therefore provides an improved method for preserving the natural color and appearance of fresh and minimally processed produce, for inhibiting white blush and other discoloration on carrots and other fruits and vegetables, and for inhibiting dehydration of the same.

While preferred embodiments of the invention have been herein described, it is to be appreciated that various changes, rearrangements and modifications may be made therein, without departing from the scope of the invention as defined by the appended claims.

What is claimed is:

1. A method of preserving the natural color and appearance of fresh and minimally processed produce comprising the step of soaking the produce for from about 1 to about 20 minutes in an aqueous solution comprised of from about 1 to about 20% by weight trehalose or an aqueous solution comprised of 1–50 by weight sugars containing 1–20 by weight trehalose.

2. A method as set forth in claim 1 wherein the aqueous solution comprises from about 3% to about 5% by weight trehalose.

3. A method as set forth in claim 1 wherein the aqueous solution contains one or more of an anti-oxidant, anti-microbial, surfactant and wetting agent.

4. A method as set forth in claim 1 wherein the produce is comprised of carrots, radishes, peppers, corn, turnips, sweet potatoes, leeks and celery.

5. A method of inhibiting discoloration and/or dehydration of fresh and minimally processed produce comprising the step of coating the produce with an aqueous solution comprised of from about 1% to about 20% by weight of trehalose.

6. A method as set forth in claim 5 wherein the aqueous solution is comprised of from about 3% to about 5% by weight of trehalose.

7. A method as set forth in claim 5 wherein the aqueous solution contains one or more sugars in addition to trehalose.

8. A method as set forth in claim 5 wherein the aqueous solution contains one or more of an anti-oxidant, anti-microbial, surfactant and wetting agent.

9. A method as set forth in claim 5 wherein the produce is comprised of carrots, radishes, peppers, corn, turnips, sweet potatoes, leeks and celery.

10. A method of inhibiting discoloration and/or dehydration of fresh and minimally processed fruits and vegetables comprising the step of coating the fruit or vegetable with an aqueous solution comprised of from about 1 to about 20 by weight of trehalose.

11. A method as set forth in claim 10 wherein the aqueous solution is comprised of from about 3 to about 5% by weight of trehalose.

12. A method as set forth in claim 10 wherein the aqueous solution contains one or more sugars in addition to trehalose.

13. A method as set forth in claim 10 wherein the aqueous solution contains one or more of an anti-oxidant, anti-microbial, surfactant and wetting agent.

14. A method as set forth in claim 10 wherein the fruits and vegetables are comprised of carrots, radishes, peppers, corn, turnips, sweet potatoes, leeks and celery.

* * * * *